United States Patent [19]

Weyers et al.

[11] Patent Number: 4,701,194

[45] Date of Patent: Oct. 20, 1987

[54] GAS-TREATING DEVICE

[75] Inventors: Charles Weyers, Oud-Turnhout; Michel Klein; Walter Goossens, both of Mol, all of Belgium

[73] Assignee: Studiecentrum voor Kernenergie, "S.C.K.", Brussels, Belgium

[21] Appl. No.: 828,894

[22] Filed: Feb. 13, 1986

[30] Foreign Application Priority Data

Feb. 20, 1985 [BE] Belgium ............................ 2/60621

[51] Int. Cl.4 ............................................ B01D 47/10
[52] U.S. Cl. .......................................... 55/228; 55/248; 55/257 R; 55/259; 261/36.1; 261/76; 261/116; 261/151; 261/DIG. 54; 261/DIG. 75
[58] Field of Search ............. 261/76, 116, 79 A, 36 R, 261/151, DIG. 54, DIG. 75; 55/229, 248, 257 R, 257 HE, 259, 228

[56] References Cited

U.S. PATENT DOCUMENTS

| 550,853 | 12/1895 | Theisen | 261/116 X |
|---|---|---|---|
| 968,332 | 8/1910 | Dow | 261/116 X |
| 1,312,898 | 8/1919 | Ehrhart | 261/116 |
| 1,853,045 | 4/1932 | Dnau | 261/76 |
| 2,020,850 | 11/1935 | Myhren et al. | 261/DIG. 54 |
| 2,337,983 | 12/1943 | Fisher | 261/DIG. 54 |
| 2,519,618 | 8/1950 | Wilson et al. | 261/DIG. 54 |
| 3,367,402 | 2/1968 | Cross, Jr. et al. | 261/DIG. 54 |
| 3,707,067 | 12/1972 | Dietrick | 261/DIG. 54 |
| 4,464,309 | 8/1984 | Linhardt | 261/116 X |

FOREIGN PATENT DOCUMENTS

| 950026 | 4/1951 | Fed. Rep. of Germany . |
|---|---|---|
| 3031951 | 3/1981 | Fed. Rep. of Germany ... 261/DIG. 54 |
| 374442 | 6/1932 | United Kingdom . |

Primary Examiner—Richard L. Chiesa
Attorney, Agent, or Firm—Stevens, Davis, Miller & Mosher

[57] ABSTRACT

In a gas treating device liquid is pressurized in a liquid chamber and is fed from this chamber into ejectors which open directly into venturi fittings which are surrounded by a gas chamber. Gas enters through an inlet into this gas chamber. A gas-liquid mixture enters from the venturi fittings into a tank, where the gas is separated from the liquid. Liquid from the tank is fed through a pump into the liquid chamber. Gas escapes from the tank into a discharge line comprising a de-mister.

2 Claims, 9 Drawing Figures

Fig. 3
Fig. 5
Fig. 4
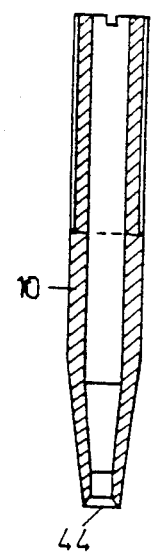
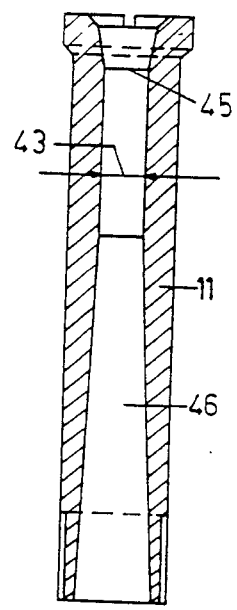
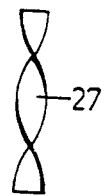
Fig. 6
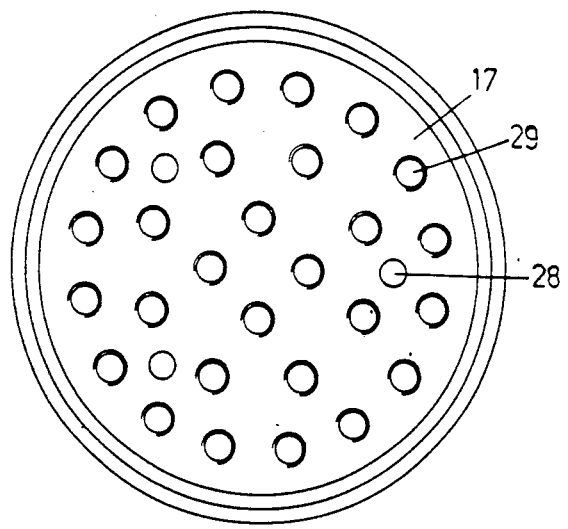

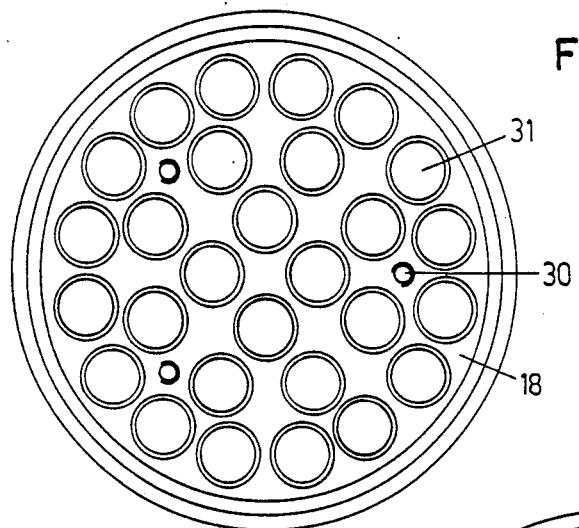
Fig. 7
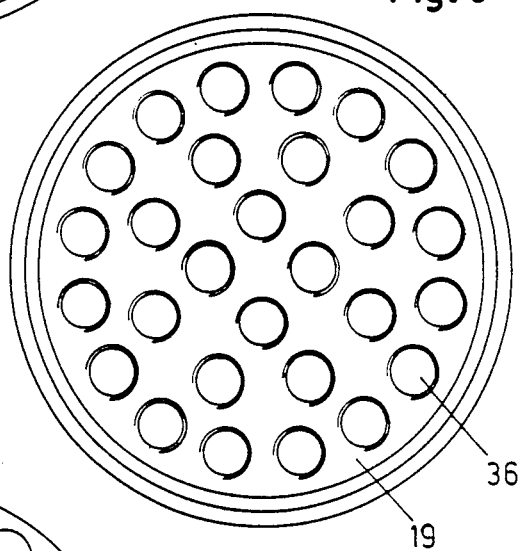
Fig. 8
Fig. 9
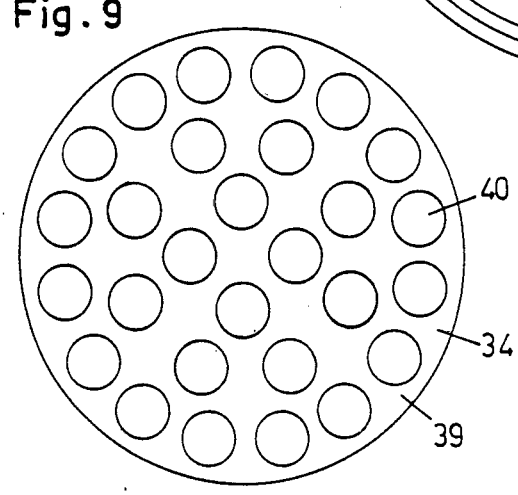

GAS-TREATING DEVICE

BACKGROUND

The invention relates to a gas-treating device with a liquid chamber,
a means which pressurizes the liquid inside said chamber,
at least two nozzles fed through the liquid chamber, the same number of venturi fittings in the extension of the nozzles,
a liquid tank which receives a gas-liquid mixture from the nozzles and the venturi fittings,
an outlet from the tank,
a gas chamber connected to the venturi fittings, and
a gas inlet to the gas chamber.

A device of this kind is known from U.S. Pat. No. 4,464,309.

In this known device, each nozzle is provided at one end of a cylinder-like tube with a length in the range of 1 m, and the venturi fitting cooperating with said nozzle is located at the other end of said tube. In said device, the gas is carried along but to a very limited rate by the liquid stream. The energy for the displacement inside the venturi fittings originates for the most part from the gas which pulverizes the liquid into very fine droplets. In said known device, the gas thus has necessarily to be fed under pressure to said gas chamber.

THE INVENTION

An object of the invention is to provide a gas-treatment device which requires no means for bringing the gas to be treated to a higher pressure at the inlet to the device and which does not require fans to force the gas through the device or to suck same from said device. Fans in the known gas-treatment devices do indeed require a lot of energy, they are often the cause the device does fail temporarily, they require quite some maintenance, and they do easily corrode.

Another object of the invention is to provide a device wherewith small particles, particularly particles with an apparent diameter smaller than 1 μm, may be removed from a gas with a high efficiency.

Still another object of the invention is to provide a gas purifier which may be built with replaceable components for an adapting to the gas flow rate to be treated and to the nature of those particles which have to be removed from the gas.

Still another object of the invention is to provide a gas-treatment device which can be combined with means for purifying gas by a centrifugal gas flow, said means being possibly provided upstream the device, in the device itself, and theoretically, even downstream from the device.

For this purpose the nozzles open directly into the venturi fittings and form together with said venturi fittings, ejector venturi fittings, and the gas chamber is connected to the ejector venturi fittings level with the connection of the nozzles to the venturi fittings.

The spacing between the outlet from a nozzle and the smallest cross-section of the corresponding venturi fitting preferably lies in the range from 5 to 100 mm.

The device preferably comprises a liquid circuit comprised of
the liquid chamber,
the ejector venturi fittings,
the liquid tank,
a space wherein gas may escape from the liquid between the tank and the ejector venturi fittings,
the means which pressurizes the liquid inside the liquid chamber, and
the outlet from the tank, and the device further also comprises a gas outlet from the tank.

A gas purifier with a closed liquid circuit is known per se from DE-A-3 031 951, but said known device notably does not comprise any ejector venturi fittings, does not pressurize the liquid in the nozzles and requires moreover a fan for the gas flow.

Preferably the liquid outlet from the tank connects to the liquid chamber and comprises a pump which forms said means for pressurizing the liquid inside the liquid chamber, wherethrough the liquid circuit is closed.

In a particular embodiment of the invention, the tank comprises a heat exchanger connecting to the space outside the tank.

In an advantageous embodiment of the invention, the device comprises at least five ejector venturi fittings which are all connected to a common gas chamber.

In a preferred embodiment of the invention, the gas chamber is bounded by an outer jacket wherein the inlet opens, a top support wherein openings are cut out for the nozzles, and a bottom with openings for the venturi fittings. Said latter structure makes it easy to replace the nozzles and venturi fittings, thus to obtain an adaptation of the ejector venturi fittings to the flow rate to be treated and to the nature of the gas and the particles which are to be removed therefrom. The number of ejector venturi fittings being required is indeed dependent on the gas flow rate to be treated.

FURTHER BACKGROUND

The invention further relates to a method which can be worked with the above-defined device and particularly to a method for treating a gas with a liquid, which comprises
forcing pressurized liquid through nozzles to venturi fittings, and
feeding gas through the venturi fittings to form a liquid-gas mixture.

A method of this kind is known from U.S. Pat. No. 4,464,309.

According to said known method, the gas should be fed under pressure and the energy from the liquid stream is not enough to insure sufficient material transfer from the gas with a view to a gas purification.

SUMMARY OF THE INVENTION

The invention contemplates to provide a method wherewith the energy originates only from the liquid stream.

For this purpose, one lets the nozzles connect directly to the venturi fittings, in such a way that they form ejector venturi fittings, and one leads the gas substantially under a pressure lower than the pressure of the liquid feeding the nozzles, to that location where the nozzles open into the venturi fittings.

The liquid is preferably pressurized to a pressure which exceeds with about 2 to 15 bars, preferably with about 3 to 5 bars the pressure of the gas which is admitted to the venturi fittings.

Other features and advantages of the invention will stand out from the following description of a gas-treating device and of a method for treating gas according to the invention; this description is only given by way of example and does not limit the invention; the reference numerals pertain to the accompanying drawings.

BRIEF DESCRIPTION OF THE DRAWINGS

FIG. 3 is a cross-section on a larger scale through an ejector from the apparatus as shown in FIG. 2.

FIG. 4 is an elevation view on the same scale as FIG. 3, of a screw which is mounted in the ejector as shown in FIG. 3.

FIG. 5 is a cross-section on the same scale as FIG. 3, of a venturi fitting from the apparatus as shown in FIG. 2.

FIG. 6 is a top view of a support for the ejectors from the apparatus as shown in FIG. 2.

FIG. 7 is a top view of a bottom of an ejector chamber from the apparatus as shown in FIG. 2.

FIG. 8 is a top view of a connecting part which forms the bottom part from a venturi chamber, from the apparatus as shown in FIG. 2.

FIG. 9 is a top view of a collecting tank from the apparatus as shown in FIG. 2.

In the various figures, the same reference numerals pertain to the same elements.

DESCRIPTION OF PREFERRED EMBODIMENT

Figure 1:
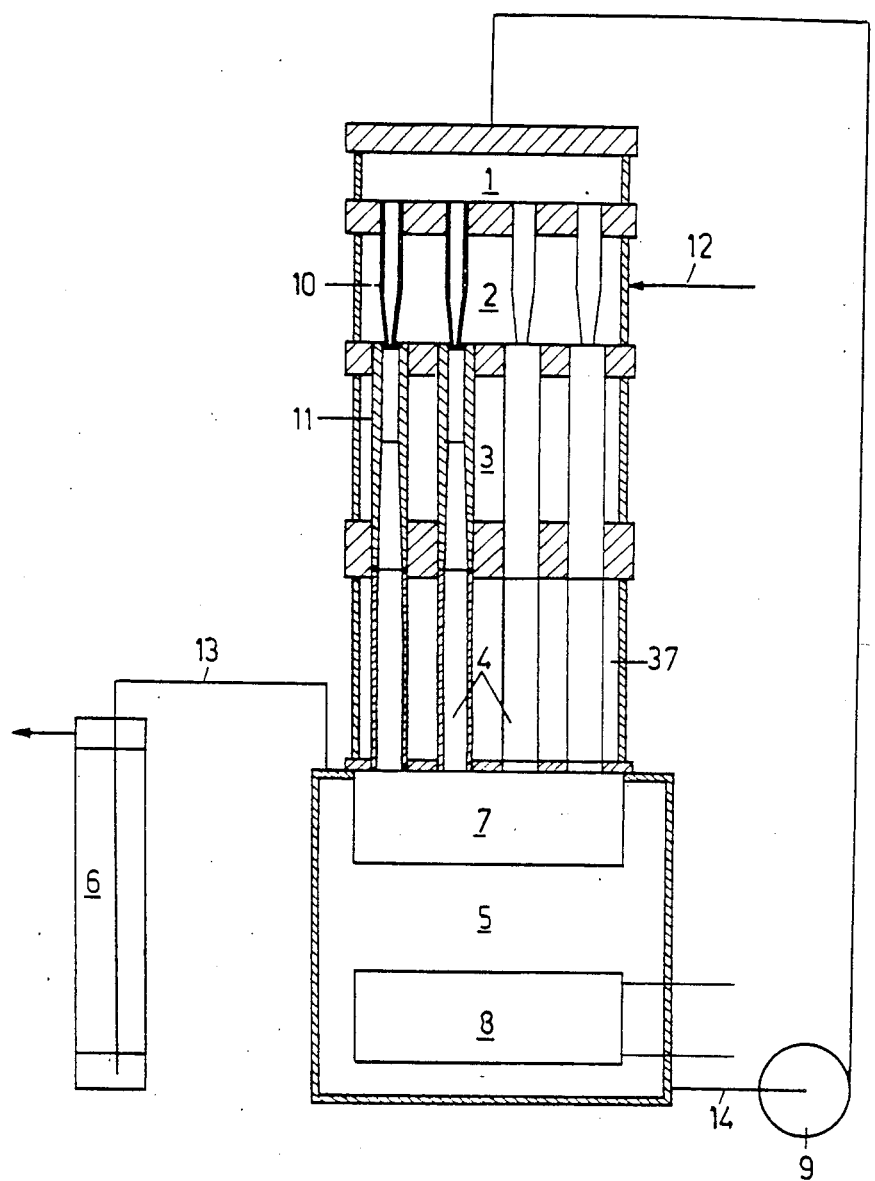
FIG. 1 is a diagrammatic showing of a gas-treating device according to the invention.

The device as shown diagrammatically in FIG. 1, is comprised of a combination of a closed liquid circuit, generally a water circuit, and an open gas circuit.

The liquid circuit comprises in series a chamber 1 for pressurized-liquid, a number of parallel ejectors 10, a number of parallel venturi fittings 11 wherein the ejectors 10 open, a number of pipes 4 which extend said venturi fittings 11, a chamber 7 for separating liquid and gas, which is supplied by said extension pipes 4, a liquid tank 5 wherein the chamber 7 opens, and a line 14 which connects the tank 5 to the chamber 1. In the line 14, a pump 9 lies which forces the liquid towards chamber 1, in such a way that the liquid flows under pressure into said chamber.

The gas is fed through line 12 into chamber 2 which surrounds said ejectors 10. The venturi fittings 11 connect with the top ends thereof to the lowermost portion of chamber 2, in such a way that said chamber 2 communicates with the venturi fittings which may thus remove gas from chamber 2. The ejectors 10 form in combination with said venturi fittings 11, ejector venturi fittings which are fed with liquid from liquid chamber 1 and which are fed with gas from gas chamber 2. The gas being carried along by the liquid into the venturi fittings 11, is further conveyed with the liquid through the pipes 4, to said chamber 7 where the gas is separated from the liquid. Inside the liquid tank 5, the gas can escape at the top through discharge line 13, by means of de-mister 6, either to the atmosphere, or to an apparatus wherein the gas is used.

The gas circuit is thus open and runs from feed line 12 through gas chamber 2, venturi fittings 11, pipes 4, separating chamber 7, tank 5 and line 13, to de-mister 6.

The venturi fittings 11 lie inside a chamber 3 and the pipes 4 which extend the venturi fittings, lie inside a chamber 37, but said chambers are part neither of the liquid circuit, nor of the gas circuit.

The liquid tank 5 exchanges heat with heat exchanger 8, the inlet and outlet of which are connected in the space outside tank 5, in such a way that for example cool water may flow through the heat exchanger to stabilize the liquid inside tank 5 to a lower temperature than that temperature which would be reached with flowing through the closed liquid circuit without cooling.

The arrangement and the working of the device may vary within wide limits.

The device is generally intended to remove dust and undesired and noxious compounds from gas, and to recover materials from industry waste gases.

The size and nature of those particles which are to be removed from the gas, may vary within wide limits, but the device is particularly designed to remove from the gas, particles with an apparent diameter smaller than 1 $\mu$m.

Tests have been made on nitrogen gas and air with latex particles having an apparent diameter from 0.09 to 0.91 $\mu$m, and with aerosols from oxides of iron, ruthenium and caesium having an apparent diameter from 0.09 to 0.33 or 0.48 $\mu$m, under conditions as further described and with results as given hereinbelow.

The number and size of the ejector venturi fittings are adapted to the flow rate to be treated and to the gas composition. It is of importance that a plurality of ejector venturi fittings 10-11 are fed by one and the same gas chamber 2.

Due to the flowing out of one and the same gas chamber 2 through a plurality of ejector venturi fittings 10-11, turbulence occurs and the various ejector venturi fittings 10-11 do mutually influence the working thereof, without the normal suction being hampered.

One and the same gas chamber has a great flexibility because it is possible to adapt the number of ejector venturi fittings in the same gas chamber to the gas flow rate to be treated. Devices have been built with sixteen and twenty-eight ejector venturi fittings whereby the openings on the outlet from ejectors had a size from 3 to 6 mm, and whereby the diameter of the narrowing shown in 43 in FIG. 5 in the venturi fitting did lie between 4 and 8 mm. The replacement of the ejectors and venturi fittings with one size, shape or material by other ones with a different size and/or shape and/or material allows an adaptation to the gas to be treated.

The ejector venturi fittings 10-11 are therefore preferably replaceably mounted in the device.

The ejectors 10 are so selected that for the pressure at which the liquid is admitted from the chamber 1 at the entrance of the ejectors 10 the liquid stream at the outlet of the ejectors is not purely laminar. The liquid stream at the outlet of the ejectors must be sufficient in order to create, at the gas pressure existing in the gas chamber 2, a gas-suction and a vaporization of the liquid forming droplets trapping the particles carried by the gas.

The length of the narrowing 43 of the venturi fitting 11 is at least twice the diameter thereof.

The length of the diverging part 46 of the venturi fittings added to the length of the extension pipes 4 is at least equal to 20 times the diameter of narrowing 43.

Devices may be manufactured for flow rates from some ten cubic meters up to a few thousands cubic meters per hour. In one and the same device, ejector venturi fittings may be disabled and thus the flow rate of a given device may be adapted.

The size of tank 5 is selected according to the total liquid volume which has to flow in the device.

The tank volume lies for example between a few hundred of litres and a few cubic meters.

For the de-mister 6, any known de-mister may be used, for example a de-mister with metal or synthetic material fibers, located in tubes wherethrough the gas has to flow before leaving the device.

The selection of de-mister 6 is no part of this invention. The object of the de-mister is to remove mist particles which are carried along with the gas flow through line 13 which connects at the top to the liquid tank 5.

The selection of the gas and liquid separator 7 is no part of the present invention either.

Said separator 7 is also actually a de-mister, for example with three to ten layers synthetic fibers wherethrough the liquid-gas mixture is forced and wherefrom the liquid escapes mainly downwards and the gas mainly sidewise, respectively to the lower portion of tank 5 and to the line 13.

The heat exchanger 8 has for object to retain as low as possible the flowing liquid temperature, for example to limit the temperature to 25° or 22°. The heat exchanger may use therefore cool water from the environment with a temperature of 10° C.

The pump 9 raises the pressure inside chamber 1 to the required pressure for a good working of the ejector venturi fittings 10–11, for example to an overpressure in the range from 2 to 15 bars, preferably in the range from 3 to 5 bars.

The apparatus according to the FIGS. 2 to 9 is part of a device which corresponds to the diagram as shown in FIG. 1. Said apparatus is comprised of a number of components which are mounted between a top flange 15 and a bottom flange 16. The apparatus outer wall is comprised of the ring-like parts 20, 21, 22 and 23 which are in turn retained respectively between the top flange 15 and an uppermost intermediate part 17, said uppermost intermediate part 17 and a middle part 18, said middle part 18 and a lowermost intermediate part 19, and said lowermost intermediate part 19 and the bottom flange 16. As it appears from the further description, the uppermost intermediate part 17 forms the ejector holder, the middle part 18 forms the venturi fitting holder, and the lowermost intermediate part 19 forms a connecting part between the venturi fittings 11 and those pipes 4 which extend said venturi fittings 11. After mounting said flanges 15 and 16, the intermediate parts 17 to 19 and the ring-like parts 20 to 23 in the way shown in FIG. 2, the top flange 15 and bottom flange 16 are connected together by connecting rods and nuts not shown in the figures. Due to such mounting, the components from the ejector venturi fittings 10–11 and the extension pipes 4 are easily replaced by corresponding components with other characteristics, or by components which as further described, close off the openings of gas chamber 2.

The chamber 1 for pressurized liquid is bounded by the top flange 15, the ejector holder 17 and the ring-like part 20. In the top flange 15, an opening 38 is cut out whereby the line 14 wherein the pump is provided, connects.

The gas chamber 2 is bounded by the ejector holder 17, the venturi fitting holder 18 which forms the bottom thereof, and the ring-like part 21. The gas-supply line 12 connects to said ring-like part 21.

The ejector holder 17 and the venturi fitting holder 18 are retained spaced from one another by three distance bushes 24 wherein screw-threaded rods 25 lie which are screwed in the venturi fitting holder 18 and bear nuts 26 which engage the top side of ejector holder 17. For this purpose, in the ejector holder 17 three openings 28 are cut out and in the venturi fitting holder 18, three not going through openings 30 provided with a screw-thread, are cut out, as it appears from FIGS. 6 and 7.

In the ejector holder 17 and in the venturi fitting holder 18, there are further provided twenty-eight openings 29 and 31 respectively. The openings 29 in the ejector holder 17 are screw-threaded and in each of said openings, an ejector 10 may be screwed. Such an ejector is shown in FIG. 3, but in combination with one and the same ejector holder, different ejectors may be mounted. Some openings 29 may also be sealed by screwing therein not an ejector, but rather a plug. Half of the openings 29 only may for example be provided with an ejector, and the other half thereof may be sealed with a plug. In each of said ejectors, a screw 27 of that type shown in FIG. 4, is mounted as this is known for ejectors from ejector venturi fittings. The ejectors 10 are locked on the ejector holder 17 by locking nuts 32.

Due to the ejectors 10 being screwed in the ejector holder 17 and being retained in position by the locking nuts 32, the height thereof is adjustable relative to the venturi fittings 11. The spacing between the bottom edge 44 of an ejector 10 (see FIG. 3) and the top edge 45 of the narrowing in the corresponding venturi fitting is adjusted between 5 and 100 mm.

The chamber 3 for the venturi fittings 11 which is part neither of the gas circuit, nor of the liquid circuit, is bounded by the venturi fitting holder 18, the connecting part 19 and the ring-like intermediate part 22. As it appears from FIGS. 7 and 8, in the venturi fitting holder 18 and in the connecting part 19, twenty-eight openings 31, 36 respectively lie facing one another. The openings 36 are screw-threaded. The venturi fittings 11 lie in the openings 31 and 36. One of these venturi fittings is shown on a larger scale in FIG. 5.

Said venturi fittings bear with a collar on a rim of an opening 31 and are screwed with the end thereof opposite said collar, in an opening 36. Such venturi fittings 11 are known per se and have as it appears mostly from FIG. 5, a converging-diverging path.

Opposite those openings 31 wherein no ejectors 10 open, no venturi fittings 11 are mounted but rather connecting bolts 33 which seal off the remaining openings 31 and 36.

In the extension of the twenty-eight venturi fittings 11, twenty-eight pipes 4 are provided which lie at the top in the openings 36 of the connecting part 19, and at the bottom in corresponding openings 40 of the plate 39. Said plate 39 shown in FIG. 9, closes at the top the small collecting tank 34.

The chamber 37 around the pipes 4 which is bounded by plate 39, connecting part 19 and ring-like intermediate part 23, is part neither of the gas circuit, nor of the liquid circuit.

The small collecting tank 34 wherein the liquid reaches a lower pressure, opens through an opening 42 into the lower space 41. Said lower space 41 opens in turn through an opening 35 cut out in the bottom flange 16, into the chamber 7 wherein gas and liquid are separated and therefrom into the tank 5.

Besides the apparatus shown in FIGS. 2 to 9, the complete device as shown in FIG. 1, further comprises the tank 5 with therein the chamber 7 for separating the gas and liquid and the heat exchanger 8, the line 14 with the pump 9 therein, and the line 13 with the de-mister 6 therein. Said latter components are also known per se and require no further description.

Figure 2:
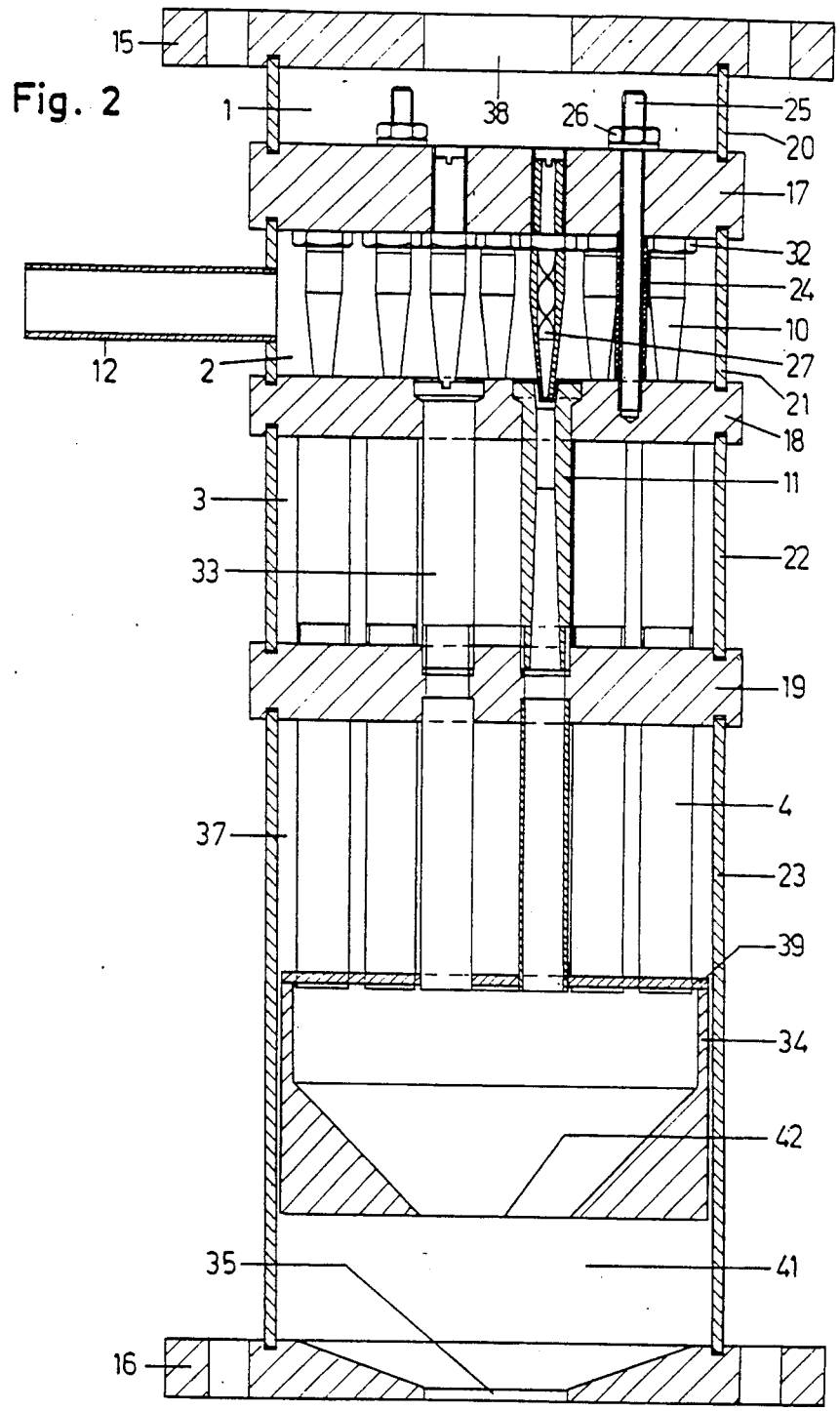
FIG. 2 is a vertical cross-section through the apparatus which forms the main part of the device as shown in FIG. 1.

In the above-described device, the gas to be purified is fed through line 12 under atmospheric pressure, with a flow-rate which is notably dependent on the size of the apparatus shown in FIG. 2, the number of ejector venturi fittings 10–11 in said apparatus, the water pressure inside chamber 1, and the flow-rate of that water which flows through the apparatus. The gas flow rate lies in the range from a few $m^3$ to some thousands $m^3/h$.

The gas is sucked through the ejector venturi fittings which are fed with water from the liquid chamber 1 which is retained by pump 9 to an overpressure in the range from 2 to 15 bars, and preferably from 3 to 5 bars.

The water flow rate is dependent on the desired gas flow rate, and may reach some ten $m^3/h$ or less up to thousands of $m^3/h$ for the device, and a fraction of $m^3$ to tens of $m^3/h$ per ejector venturi fitting 10–11.

The contemplated gas purification is all the better as the liquid pressure inside the ejectors 10 increases and the ratio between the liquid flow rate and the gas flow rate becomes higher. The speed of the liquid jet at the outlet from the ejectors 10 should be faster than the gas speed at the inlet to the narrowing 43 of the venturi fittings 11.

With a device as shown in FIG. 1, fitted with an apparatus according to FIGS. 2 to 9, tests have been made under the following working conditions:

| | |
|---|---|
| number of ejector venturi fittings 10–11 | 28 |
| ∅ at the bottom of the ejectors | 3 mm |
| water pressure inside chamber 1 | 4.2 bars |
| total water flow rate | 12.7 $m^3/h$ |
| flow rate of the sucked gas | 15 $m^3/h$ |
| working temperature | 22° C. |

A first series measurings has been conducted by means of artificial aerosol particles in nitrogen. Use has been made for liquid, of 60 liters de-mineralized water. As a function of the apparent diameter in micrometers of the particles, the decontamination factor and the capture percentage have been measured. For latex particles this lead to the following results.

| | apparent diameter in $\mu m$ | | | | | | |
|---|---|---|---|---|---|---|---|
| | 0.09 | 0.173 | 0.22 | 0.33 | 0.48 | 0.62 | 0.91 |
| DF | 144 | 470 | 700 | 5,200 | 40,000 | 90,000 | 490,000 |
| capture % | 99.3 | 99.78 | 99.85 | 99.98 | 99,9975 | 99.998 | 99.9998 |

Further tests have been made with aerosols from iron oxides, ruthenium oxides and caesium oxides in air. This lead to the following results. These results are markedly better than those results which are obtained with known devices.

| | apparent diameter in $\mu m$ | | | | | |
|---|---|---|---|---|---|---|
| | 0.09 | 0.173 | 0.22 | 0.33 | 0.48 | |
| DF | 205 | 508 | 1,450 | 4,400 | 33,000 | $Fe_2O_3$ $Fe_3O_4$ |
| DF | 380 | 590 | 710 | 1,100 | — | $RuO_2$ Ru complex |
| DF | 110 | 230 | 480 | 1,600 | — | $CsO_2$ $Cs_2O_2$ |

The number of aerosols after the de-mister also was substantially lower than with the known devices, mostly when the flowing water temperature in the device was retained below 25° C.

Besides a high decontamination factor and a high capture percentage, the device according to the invention also has for particular advantages, the high adaptation capacity to the gases to be treated, due to the replaceability of the various components and due to the fact that the number of ejector venturi fittings may be adapted to the gas to be treated. Said apparatus may consequently be manufactured on a large scale. Another advantage lies in the apparatus operation requiring less energy with better results. The operating costs as well as the initial costs lie relatively low.

The invention is in no way limited to the above-described embodiment and within the scope of the patent application, many changes may be brought in the described embodiment, notably as regards the shape, the number and the arrangement of the components.

The number of ejector venturi fittings is for example not critical on the condition that a high enough number of ejector venturi fittings connect to one and the same gas chamber.

Although the gas chamber is shown and described as a chamber surrounding the venturi fittings and receiving directly the gas from the gas inlet, the gas chamber can also connect in another way to the venturi fittings. The gas chamber may be preceded by a part wherein the gas circulates centrifugally thus performing a first purification by separation of solid or liquid particles. The gas chamber may also be constructed as such part.

More particularly the gas chamber may be preceded by a cyclone.

The entry of the device, upstream of the gas chamber can be constructed as a chamber creating a centrifugal movement.

The gas chamber itself can be constructed in this way. Thus the biggest particles can be separated from the gas before it reaches the venturi fittings.

Although the given example mentions gas supply at atmospheric pressure, gas can also be supplied at another operation pressure. Then the liquid pressure is to be adapted to this higher gas pressure.

It is essential that the jet of liquid droplets at the outlet of the ejectors has a speed faster than the speed of the there arriving gas in order to perform the required gas purifying.

We claim:

1. A gas treating device comprising:
   a liquid chamber,
   several nozzles connected to said liquid chamber for receiving liquid from said liquid chamber,
   several venturi fittings, one venturi fitting for each nozzle, each nozzle having an outlet at a distance in the range from 5 to 100 mm from a smallest cross-section of the venturi fitting into which it opens, said nozzles thus forming with said venturi fittings ejector venturi fittings,
   a gas chamber surrounding the nozzles,
   an inlet to said gas chamber for bringing gas into said gas chamber,
   a tank into which said venturi fittings open,
   a separator of gas and liquid at the entry of said tank,
   a first outlet at the top of this tank for evacuating gas from this tank,
   a de-mister to which said first outlet is connected,
   a second outlet at the bottom of this tank for evacuating liquid from this tank, a line connecting the second outlet of this tank to an entry of said liquid chamber,
a heat exchanger in said tank and connected to a space outside this tank, and
a pump in said line.

2. A gas treating device comprising:
a liquid chamber,
several nozzles connected to said liquid chamber for receiving liquid from said liquid chamber,
several venturi fittings, one venturi fitting for each nozzle, each nozzle having an outlet at a distance in the range from 5 to 100 mm from a smallest cross-section of the venturi fitting into which it opens, said nozzles thus forming with said venturi fittings ejector venturi fittings,
a gas chamber surrounding the nozzles,
an inlet to said gas chamber for bringing gas into said gas chamber,
cylindrical pipes extending said venturi fittings,
a cone-like collecting tank into which said cylindrical pipes open,
a second tank into which said cone-like collecting tank opens,
a separator of gas and liquid at the entry of said second tank,
a first outlet at the top of this second tank for evacuating gas from this second tank,
a de-mister to which said first outlet is connected,
a second outlet at the bottom of this second tank for evacuating liquid from this second tank,
a line connecting the second outlet of this second tank to an entry of said liquid chamber,
a heat exchanger in said second tank and connected to a space outside this second tank, and
a pump in said line.

* * * * *